(12) United States Patent
Iijima et al.

(10) Patent No.: US 8,728,220 B2
(45) Date of Patent: May 20, 2014

(54) $CO_2$ RECOVERY SYSTEM

(75) Inventors: Masaki Iijima, Tokyo (JP); Masahiko Tatsumi, Hyogo (JP); Yasuyuki Yagi, Hyogo (JP)

(73) Assignees: Mitsubishi Heavy Industries, Ltd., Tokyo (JP); The Kansai Electric Power Co., Inc., Osaka (JP)

( * ) Notice: Subject to any disclaimer, the term of this patent is extended or adjusted under 35 U.S.C. 154(b) by 0 days.

(21) Appl. No.: 13/879,298

(22) PCT Filed: Jul. 27, 2011

(86) PCT No.: PCT/JP2011/067158
§ 371 (c)(1),
(2), (4) Date: Apr. 12, 2013

(87) PCT Pub. No.: WO2012/073553
PCT Pub. Date: Jun. 7, 2012

(65) Prior Publication Data
US 2013/0192470 A1 Aug. 1, 2013

(30) Foreign Application Priority Data
Dec. 1, 2010 (JP) .................................. 2010-268865

(51) Int. Cl.
*B01D 53/14* (2006.01)
(52) U.S. Cl.
USPC .................. 96/234; 96/242; 95/173; 95/183; 95/227; 95/236
(58) Field of Classification Search
None
See application file for complete search history.

(56) References Cited

U.S. PATENT DOCUMENTS

| 5,344,627 | A | * | 9/1994 | Fujii et al. | ...................... 423/220 |
| 6,800,120 | B1 | | 10/2004 | Won et al. | |
| 7,485,274 | B2 | * | 2/2009 | Kamijo et al. | ................. 423/220 |
| 8,080,089 | B1 | * | 12/2011 | Wen et al. | ......................... 95/166 |

(Continued)

FOREIGN PATENT DOCUMENTS

| JP | 48-010712 B1 | 4/1973 |
| JP | 50-040472 A | 4/1975 |

(Continued)

OTHER PUBLICATIONS

International Search Report for PCT/JP2011/067158, mailing date of Nov. 1, 2011.

(Continued)

*Primary Examiner* — Duane Smith
*Assistant Examiner* — Pankti Patel
(74) *Attorney, Agent, or Firm* — Westerman, Hattori, Daniels & Adrian, LLP

(57) ABSTRACT

A $CO_2$ recovery system according to the present invention includes: a cooling tower that uses cooling water to cool a $CO_2$-containing exhaust gas discharged from industrial equipment such as a boiler or a gas turbine; a $CO_2$ absorber that brings the cooled $CO_2$-containing exhaust gas into contact with a $CO_2$-absorbent that absorbs $CO_2$, thereby removing the $CO_2$ from the exhaust gas; and a first absorbent regenerator and a second absorbent regenerator that release $CO_2$ from a $CO_2$-absorbent that has absorbed $CO_2$ (rich solution), thereby regenerating the $CO_2$-absorbent. A second lean solution at the outlet of the second absorbent regenerator is subjected to vacuum flash vaporization, and the resulting vapor is inputted to the first absorbent regenerator.

6 Claims, 6 Drawing Sheets

(56) References Cited

U.S. PATENT DOCUMENTS

| | | | |
|---|---|---|---|
| 2001/0021362 A1* | 9/2001 | Ishida | 423/228 |
| 2006/0032377 A1* | 2/2006 | Reddy et al. | 96/234 |
| 2009/0205946 A1 | 8/2009 | Reddy et al. | |
| 2010/0132563 A1* | 6/2010 | Pan et al. | 96/181 |

FOREIGN PATENT DOCUMENTS

| | | |
|---|---|---|
| JP | 54-150372 A | 11/1979 |
| JP | 07-051537 A | 2/1995 |
| JP | 2001-025627 A | 1/2001 |
| JP | 2005-254212 A | 9/2005 |
| JP | 2009-519828 A | 5/2009 |
| WO | 2005/097299 A1 | 10/2005 |

OTHER PUBLICATIONS

Written Opinion of PCT/JP2011/067158, mailing date of Nov. 1, 2011.

* cited by examiner

CO₂ RECOVERY SYSTEM

FIELD

The present invention relates to a $CO_2$ recovery system that uses an absorbent removing $CO_2$ contained in an exhaust gas.

BACKGROUND

In recent years, a greenhouse effect caused by $CO_2$ has been pointed out as one of causes of global warming. Accordingly, measures against the greenhouse effect have been urgently and internationally needed for the protection of the global environment. Since a source of $CO_2$ corresponds to the whole field of human activity using the combustion of fossil fuel, a demand for the suppression of $CO_2$ emission tends to become stronger. Accordingly, as measures against an ingredient (chemical use) such as urea, an increase in production of crude oil, and global warming, a method of removing and recovering $CO_2$, which is contained in a flue gas, by bringing a flue gas of a boiler into contact with an amine-based $CO_2$-absorbent and a method of storing recovered $CO_2$ without releasing recovered $CO_2$ to the atmosphere have been energetically studied for power generation facilities, such as thermoelectric power plants using a large amount of fossil fuel.

As a practical method of recovering and storing $CO_2$ contained in a large amount of flue gas, there is a chemical absorption technique that brings a flue gas into contact with a $CO_2$-absorbent such as an amine aqueous solution. A process for bringing a flue gas into contact with a $CO_2$-absorbent in a $CO_2$ absorber, a process for liberating $CO_2$ and regenerating an absorbent by heating the absorbent having absorbed $CO_2$ in an absorbent regenerator, and a process for circulating the absorbent in the $CO_2$ absorber again to reuse the absorbent are employed as processes for removing and recovering $CO_2$ from a flue gas by using the above-mentioned $CO_2$-absorbent (Patent Literature 1).

The operation of a $CO_2$ recovery apparatus using this chemical absorption technique in the related art causes an amine aqueous solution and $CO_2$ to be separated from each other in the absorbent regenerator by high-temperature steam, but the consumption of this steam (energy) has needed to be minimized. For this purpose, methods using a mixture of two or more kinds of different $CO_2$-absorbents (Patent Literatures 2 and 3) and a method of improving a process for feeding a $CO_2$-absorbent (Patent Literature 4) have been examined until now.

CITATION LIST

Patent Literature

Patent Literature 1: Japanese Laid-open Patent Publication No. 7-51537
Patent Literature 2: Japanese Laid-open Patent Publication No. 2001-25627
Patent Literature 3: Japanese Laid-open Patent Publication No. 2005-254212
Patent Literature 4: U.S. Pat. No. 6,800,120

SUMMARY

Technical Problem

However, since a system, which absorbs, removes, and recovers $CO_2$ from a $CO_2$-containing exhaust gas such as a flue gas by using the above-mentioned $CO_2$-absorbent, is additionally installed on a combustion facility, the operating cost of the system also needs to be reduced as much as possible. In particular, since a large amount of heat energy is consumed in the absorbent regenerator that regenerates an absorbent, it is necessary to use a process for further reducing the energy of steam and saving energy as much as possible.

Further, if the size of the $CO_2$ recovery system in the related art is increased so that the amount of $CO_2$ to be recovered per day becomes, for example, 1000 t or more, a large amount of heat energy of a reboiler is consumed in a regeneration process. For this reason, it is necessary to reduce the energy of steam and to save energy.

The invention has been made in consideration of the above-mentioned problem, and an object of the invention is to provide a $CO_2$ recovery system that further reduces the heat energy of a reboiler and saves energy.

Solution to Problem

According to a first aspect of the present invention in order to solve the above problems, there is provided a $CO_2$ recovery system including: a $CO_2$ absorber that brings a cooled $CO_2$-containing exhaust gas into contact with a $CO_2$-absorbent absorbing $CO_2$ to remove $CO_2$ from the exhaust gas; a first absorbent regenerator that regenerates an absorbent by releasing $CO_2$ from a $CO_2$-absorbent having absorbed $CO_2$; a second absorbent regenerator that regenerates an absorbent by releasing residual $CO_2$ from a first lean solution discharged from the first absorbent regenerator; and a flash drum that flashes a second lean solution discharged from the second absorbent regenerator, wherein vapor generated in the flash drum is inputted to the first absorbent regenerator.

According to a second aspect of the present invention, there is provided the $CO_2$ recovery system according to the first aspect, further including a lean/lean solution heat exchanger where the first lean solution exchanges heat with a third lean solution flashed in the flash drum.

According to a third aspect of the present invention, there is provided the $CO_2$ recovery system according to the first aspect further including a port which is provided in the first absorbent regenerator at a middle portion in a vertical axis direction of the first absorbent regenerator and through which a semi-lean solution is extracted, a circulation line to which the semi-lean solution is extracted and along which the semi-lean solution returns to a return port closer to the bottom than the extraction port, and a semi-lean/lean solution heat exchanger which is provided on the circulation line and where a third lean solution flashed in the flash drum exchanges heat with the semi-lean solution.

According to a fourth aspect of the present invention, there is provided the $CO_2$ recovery system according to the first aspect further including a lean/lean solution heat exchanger where the first lean solution exchanges heat with a third lean solution flashed in the flash drum, a port which is provided in the first absorbent regenerator at a middle portion in a vertical axis direction of the first absorbent regenerator and through which a semi-lean solution is extracted, a circulation line to which the semi-lean solution is extracted and along which the semi-lean solution returns to a return port closer to the bottom than the extraction port, and a semi-lean/lean solution heat exchanger which is provided on the circulation line and where the third lean solution exchanges heat with the semi-lean solution.

According to a fifth aspect of the present invention, there is provided the $CO_2$ recovery system according to any one of the first to fourth aspects, further including: a cooling tower that cools the $CO_2$-containing exhaust gas by cooling water.

Advantageous Effects of Invention

According to the invention, a $CO_2$ recovery system includes first and second absorbent regenerators that regenerate an absorbent by releasing $CO_2$ from a $CO_2$-absorbent having absorbed $CO_2$ (rich solution), and a second lean solution at the outlet of the second absorbent regenerator is subjected to vacuum flash vaporization, and the resulting vapor is inputted to the first absorbent regenerator. Accordingly, it is possible to further reduce the heat energy of a reboiler and to save energy.

DESCRIPTION OF EMBODIMENTS

The invention will be described in detail below with reference to the drawings. Meanwhile, the invention is not limited by this embodiment. Further, components of the following embodiments include components that can be easily supposed by those skilled in the art or substantially the same components.

First Embodiment

Figure 1:
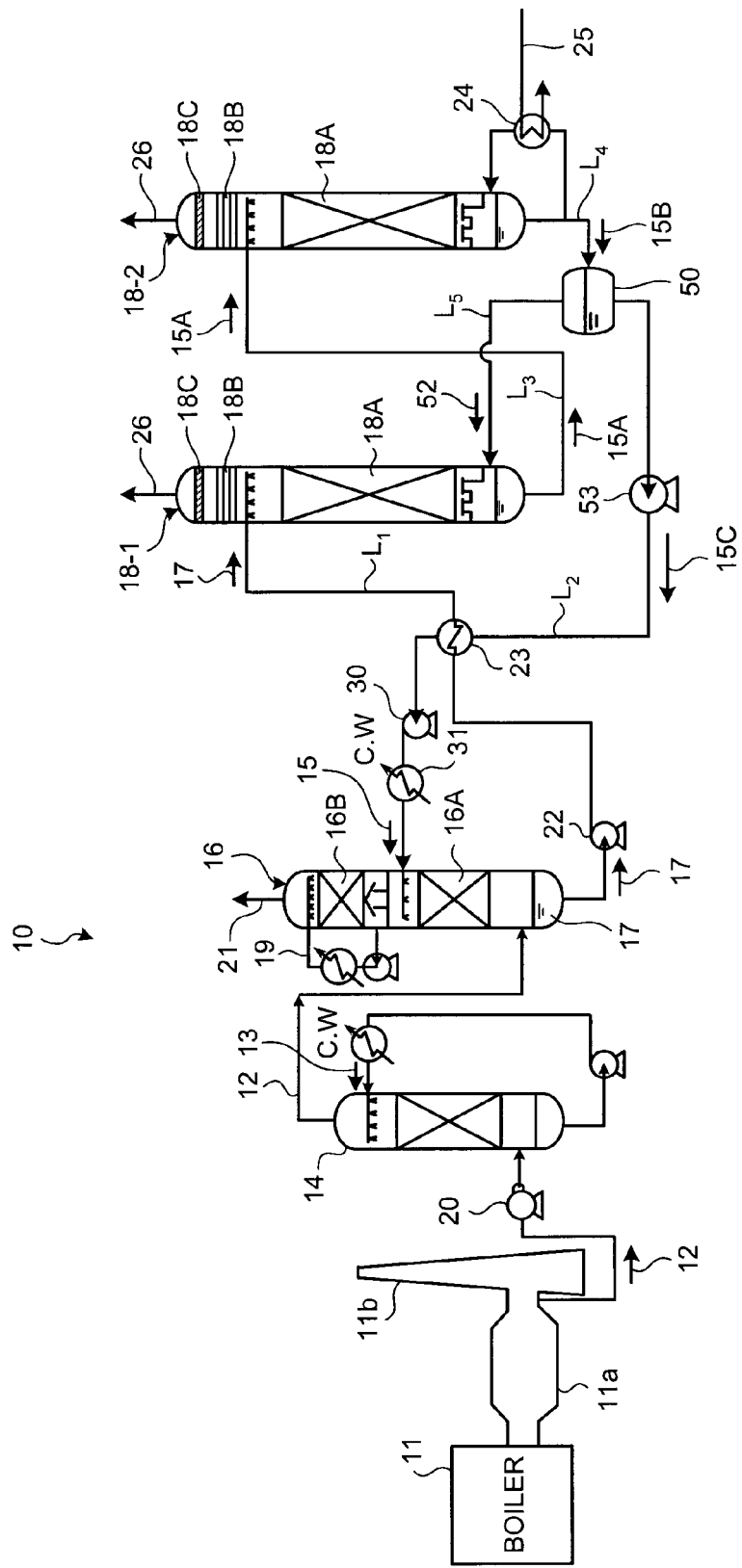
FIG. 1 is a schematic view of a $CO_2$ recovery system according to a first embodiment.

A $CO_2$ recovery system according to an embodiment of the invention will be described with reference to the drawings. FIG. 1 is a schematic view of a $CO_2$ recovery system.

As illustrated in FIG. 1, a $CO_2$ recovery system 10 includes a cooling tower 14 that uses cooling water 13 to cool a $CO_2$-containing exhaust gas 12 discharged from industrial equipment such as a boiler 11 or a gas turbine, a $CO_2$ absorber 16 that brings the cooled $CO_2$-containing exhaust gas 12 into contact with a $CO_2$-absorbent 15 absorbing $CO_2$ to remove $CO_2$ from the exhaust gas 12, a first absorbent regenerator 18-1 that regenerates a first lean absorbent (first lean solution) 15A by releasing $CO_2$ from a $CO_2$-absorbent 17 having absorbed $CO_2$ (rich solution), and a second absorbent regenerator 18-2 that regenerates a second lean absorbent (second lean solution) 15B.

In this system, the first lean solution 15A, from which $CO_2$ has been removed in the first absorbent regenerator 18-1, is sent to the second absorbent regenerator 18-2. $CO_2$ is removed from the first lean solution 15A again in the second absorbent regenerator 18-2, so that a second lean solution 15B is generated. Then, the second lean solution 15B is subjected to vacuum flash vaporization in a flash drum 50, so that gas-side vapor 52 is used as a heat source of the first absorbent regenerator 18-1 and liquid-side vapor having been flashed in the flash drum 50 forms a third lean absorbent (third lean solution) 15C. After that, the vapor is cooled, sent to the $CO_2$ absorber 16, and is used as the $CO_2$-absorbent 15, which absorbs $CO_2$ contained in the exhaust gas 12, again.

In a $CO_2$ recovery method using the $CO_2$ recovery system 10, first, after the pressure of the $CO_2$-containing exhaust gas 12 is increased by an exhaust gas blower 20, the $CO_2$-containing exhaust gas 12 is sent to the cooling tower 14, is cooled by the cooling water 13 in the cooling tower 14, and is sent to the $CO_2$ absorber 16.

The $CO_2$ absorber 16 is provided with filling portions 16A and 16B therein, and the contact efficiency between the exhaust gas 12 and the $CO_2$-absorbent 15 is improved in the filling portion 16A that is provided at the lower portion of the $CO_2$ absorber 16. The contact efficiency between the exhaust gas 12 and a cooling water 13 is improved in the filling portion 16B that is provided at the upper portion of the $CO_2$ absorber 16.

In the $CO_2$ absorber 16, the exhaust gas 12 comes into contact with, for example, the amine-based $CO_2$-absorbent 15 and $CO_2$ contained in the exhaust gas 12 is absorbed in the $CO_2$-absorbent 15 by a chemical reaction ($R-NH+H_2O+CO_2 \rightarrow R-NH_3HCO_3$). Accordingly, a purified exhaust gas 21 from which $CO_2$ has been removed is released to the outside of the system. A $CO_2$-absorbent 17, which has absorbed $CO_2$, is also referred to as a "rich solution". The pressure of the rich solution 17 is increased by a rich solvent pump 22, and the rich solution 17 is heated by exchanging heat with a regenerated third lean absorbent 15C at a rich/lean solution heat exchanger 23. Then, the heated rich solution 17 is supplied to the first absorbent regenerator 18-1.

The rich solution 17 is supplied to the first absorbent regenerator 18-1 from the $CO_2$ absorber 16 through a rich solution supply line $L_1$. Further, the third lean solution 15C is supplied to the $CO_2$ absorber 16 from the second absorbent regenerator 18-2 through a lean solution supply line $L_2$, which has been flashed in the flash drum 50, via a lean solution pump 53. The rich/lean solution heat exchanger 23 is provided at an intersection between the rich solution supply line $L_1$ and the lean solution supply line $L_2$.

Meanwhile, the third lean solution 15C, which has been flashed in the flash drum 50, is cooled by a lean solvent cooler 31 and is introduced into the $CO_2$ absorber 16 as the $CO_2$-absorbent 15.

Figure 2:
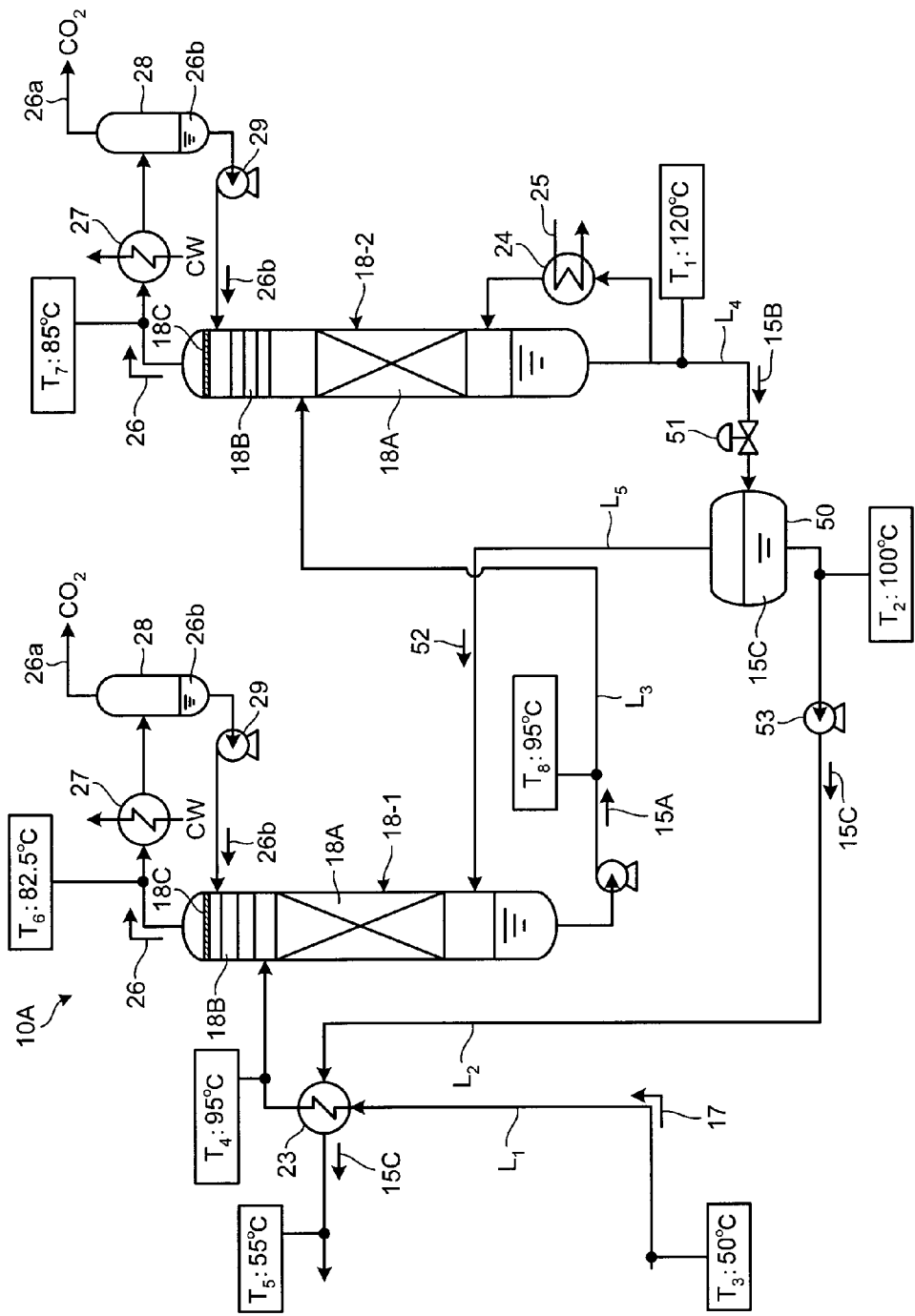
FIG. 2 is a diagram illustrating main parts of a first absorbent regenerator and a second absorbent regenerator according to the first embodiment.

FIG. 2 is a diagram illustrating main parts of the first absorbent regenerator 18-1 and the second absorbent regenerator 18-2.

When being introduced into the first absorbent regenerator 18-1 from the upper portion of the first absorbent regenerator 18-1 and flowing downward in the first absorbent regenerator 18-1, the rich solution 17 subjected to heat exchange by the rich/lean solution heat exchanger 23 reacts endothermically with the vapor 52, releases most of $CO_2$, and is regenerated. The absorbent from which a part or most of $CO_2$ has been released in the first absorbent regenerator 18-1 is referred to as a "semi-lean solution". The absorbent, which has released a part or most of $CO_2$ in the first absorbent regenerator 18-1, is referred to as a "semi-lean solution". When reaching the lower portion of the first absorbent regenerator 18-1, the semi-lean solution becomes the first lean solution 15A from which most of $CO_2$ has been removed.

After that, when being introduced into the second absorbent regenerator 18-2 and flowing downward in the second absorbent regenerator 18-2, the first lean absorbent 15A reacts endothermically with the vapor, releases most of residual $CO_2$, and is regenerated. This second lean solution 15B, which is regenerated by the removal of $CO_2$, is indirectly superheated by saturated vapor 25 in a regenerating superheater 24, and supplies vapor into the tower.

Further, a $CO_2$ gas 26, which is released from the rich solution 17 and the semi-lean solution in the first and second absorbent regenerators and contains vapor, is discharged from the tops of the respective first and second absorbent regenerators 18-1 and 18-2; the vapor is condensed by a condenser 27; water 26b is separated by a separation drum 28; and a $CO_2$ gas 26a is discharged to the outside of the system. As a result, $CO_2$ is recovered. The water 26b, which is separated by the separation drum 28, is supplied to the upper portion of an absorbent regenerator 18 by a condensed water circulating pump 29.

Furthermore, a second lean solution 15B, which is regenerated in the second absorbent regenerator 18-2, is introduced to the flash drum 50 and flashed. Accordingly, the temperature of the lean solution 15 becomes 100° C.; the temperature of the third lean solution 15C introduced into the rich/lean solution heat exchanger 23 becomes 100° C. or less; and the temperature of the rich solution 17, which has been subjected to heat exchange after being introduced into the rich/lean solution heat exchanger 23 while having a temperature of 50° C., becomes 95° C. In FIG. 2, a reducing valve 51 is illustrated.

The third lean solution 15C, which is flashed in the flash drum 50, is cooled by the rich solution 17 at the rich/lean solution heat exchanger 23. Subsequently, the pressure of the third lean solution 15C is increased by a lean solvent pump 30. Then, after being further cooled by the lean solvent cooler 31, the third lean solution 15C is supplied to the $CO_2$ absorber 16 again and is reused as the $CO_2$-absorbent 15.

Meanwhile, in FIG. 1, a flue 11a of industrial equipment such as the boiler 11 or a gas turbine, a chimney 11b, filling portions 18A and 18B, and a mist eliminator 18C are illustrated. The $CO_2$ recovery system may be provided afterward in order to recover $CO_2$ from an existing source of the exhaust gas 12, and may be simultaneously provided together with a new source of the exhaust gas 12. A door, which can be opened and closed, is installed on the chimney 11b, and is closed when the $CO_2$ recovery system is operated. Further, the door is set to be opened when the source of the exhaust gas 12 is operating but the operation of the $CO_2$ recovery system is stopped.

In this embodiment, the first and second absorbent regenerators 18-1 and 18-2 are provided and the flash drum 50 is provided as a lean-solution temperature-reduction unit for recovering the heat of the second lean solution 15B discharged from the second absorbent regenerator 18-2. Accordingly, the heat of the second lean solution 15B is effectively used.

The first lean solution 15A is supplied to the second absorbent regenerator 18-2 from the first absorbent regenerator 18-1 through a first lean solution supply line $L_3$. Further, the second lean solution 15B is supplied to the flash drum 50 from the second absorbent regenerator 18-2 through a second lean solution supply line $L_4$.

The vapor 52, which is flashed from the flash drum 50, is supplied to the first absorbent regenerator 18-1 through a vapor supply line $L_5$ that extends from the flash drum 50.

One third lean solution 15C of which the pressure has been reduced is supplied to the $CO_2$ absorber 16 through the lean solution supply line $L_2$ that extends from the flash drum 50.

That is, since the second lean solution 15B is superheated by vapor that is indirectly heated by the saturated vapor 25 in the second absorbent regenerator 18-2, the second lean solution 15B is discharged to the outside of the system while having a temperature of about 120° C. Then, the second lean solution 15B is introduced into the flash drum 50.

In this case, since the heat of the second lean solution 15B is recovered by the flash drum 50 so that the temperature of the second lean solution 15B is lowered and the second lean solution 15B becomes the third lean solution 15C, it is possible to reduce the heat exchange capacity of the rich/lean solution heat exchanger 23.

Here, when the temperature $T_1$ of the second lean solution 15B discharged from the second absorbent regenerator 18-2 is, for example, 120° C., the second lean solution 15B is flashed in the flash drum 50. Accordingly, the temperature $T_2$ of the third lean solution 15C, which has been flashed, becomes about 100° C.

For example, when the temperature $T_3$ of the rich solution 17 is 50° C., heat exchange is performed while the temperature $T_2$ of the third lean solution 15C introduced into the rich/lean solution heat exchanger 23 is 100° C. or less. Accordingly, the temperature $T_4$ of the rich solution 17 after heat exchange becomes 95° C. Further, the temperature $T_5$ of the third lean solution 15C after heat exchange is lowered to 55° C. Meanwhile, the temperature $T_6$ of a solution, which is discharged as vapor to the outside from the first absorbent regenerator 18-1, is 82.5° C., and the temperature $T_7$ of a solution, which is discharged to the outside from the second absorbent regenerator 18-2, is 85° C. Meanwhile, the temperature $T_8$ of the first lean solution 15A, which is supplied to the second absorbent regenerator 18-2 from the first absorbent regenerator 18-1, is 95° C.

Here, the pressure in the absorbent regenerator 18 is 0.9 kg/cm²G.

Accordingly, since the temperature of the rich solution 17, which is introduced into the first absorbent regenerator 18-1, is lower than that in the past, it is possible to reduce the amount of reboiler heat at the first absorbent regenerator 18-1.

Here, the breakdown of the amount of reboiler heat of the first and second absorbent regenerators 18-1 and 18-2 corresponds to the sum $Q_R$ (621 kcal/kg$CO_2$) of (a) the amount Q1 of reaction heat that is required to regenerate the rich solution 17 (404 kcal/kg$CO_2$), (b) the amount Q2 of heat loss of a solution that is discharged from the absorbent regenerator 18 (55 kcal/kg$CO_2$), and (c) the amount Q3 of heat loss of vapor that is discharged together with $CO_2$ from the first and second absorbent regenerators 18-1 and 18-2 (162 kcal/kg$CO_2$).

Figure 6:
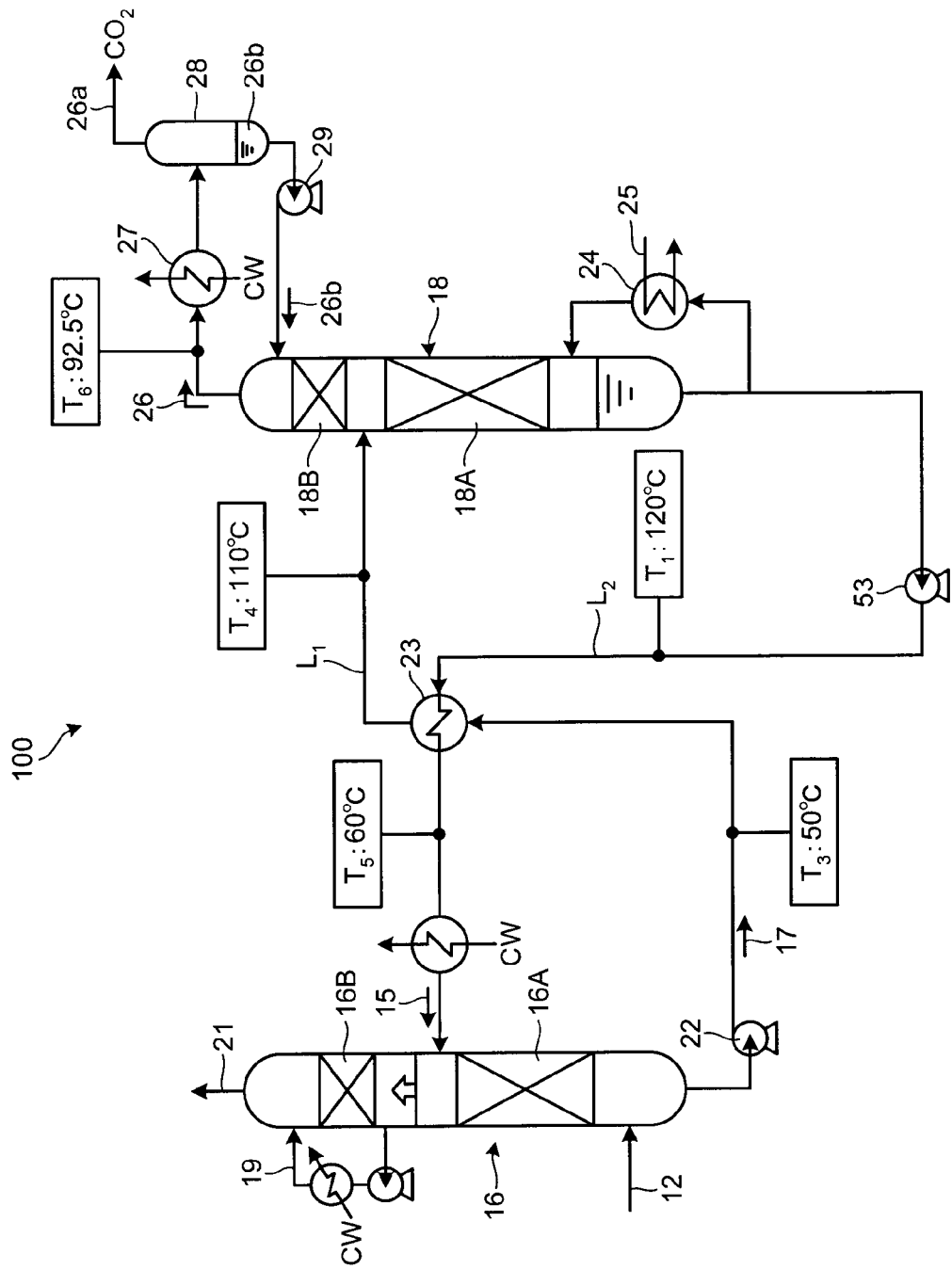
FIG. 6 is a schematic view of a $CO_2$ recovery system in the related art.

In contrast, for example, if the temperature $T_3$ of a rich solution 17 is 50° C., when the heat of a lean solution 15 is not recovered as in a $CO_2$ recovery system 100 in the related art illustrated in FIG. 6, heat exchange is performed while the temperature $T_1$ of the lean solution 15 introduced into a rich/lean solution heat exchanger 23 is 120° C. Accordingly, the temperature $T_4$ of the rich solution 17 after heat exchange becomes 110° C. Further, the temperature $T_5$ of the lean solution 15 after heat exchange is lowered to 60° C. Meanwhile, the temperature $T_6$ of the solution, which is discharged as vapor to the outside, is 92.5° C.

Accordingly, the breakdown of the amount of reboiler heat corresponds to the sum $Q_R$ (665 kcal/kg$CO_2$) of (a) the amount $Q_1$ of reaction heat that is required to regenerate an absorbent (404 kcal/kg$CO_2$), (b) the amount $Q_2$ of heat loss of a solution that is discharged from an absorbent regenerator 18 (110 kcal/kg$CO_2$), and (c) the amount $Q_3$ of heat loss of vapor that is discharged together with $CO_2$ from the absorbent regenerator 18 (151 kcal/kg$CO_2$).

Since the amount of reboiler heat of first and second absorbent regenerators 18-1 and 18-2 of a $CO_2$ recovery system 10A according to the invention illustrated in FIG. 2 is 621 kcal/kg$CO_2$ and the amount of reboiler heat of the absorbent regenerator 18 of the $CO_2$ recovery system 100 in the related art illustrated in FIG. 6 is 665 kcal/kg$CO_2$ as described above, it has been found out that the amount of reboiler heat can be significantly reduced.

As described above, according to the invention, it is possible to significantly reduce the sum of the amount of heat at the absorbent regenerators and running cost is significantly reduced since the heat of the lean solution is effectively recovered.

Meanwhile, a technique for reducing the amount of reboiler heat in the tower by raising the temperature of the rich solution 17 supplied into the absorbent regenerator 18 has been mainly examined in a proposal in the related art. However, in the invention, the amount of reboiler heat is reduced as a whole in consideration of not only the amount of heat in the tower but also (b) the amount $Q_2$ of heat loss of the solution (lean solution) that is discharged from the absorbent regenerator 18 and (c) the amount $Q_3$ of heat loss of vapor that is discharged together with $CO_2$ from the absorbent regenerator 18. Accordingly, it is possible to improve the energy efficiency of the entire system by recovering the heat of the lean solution 15.

[Second Embodiment]

Figure 3:
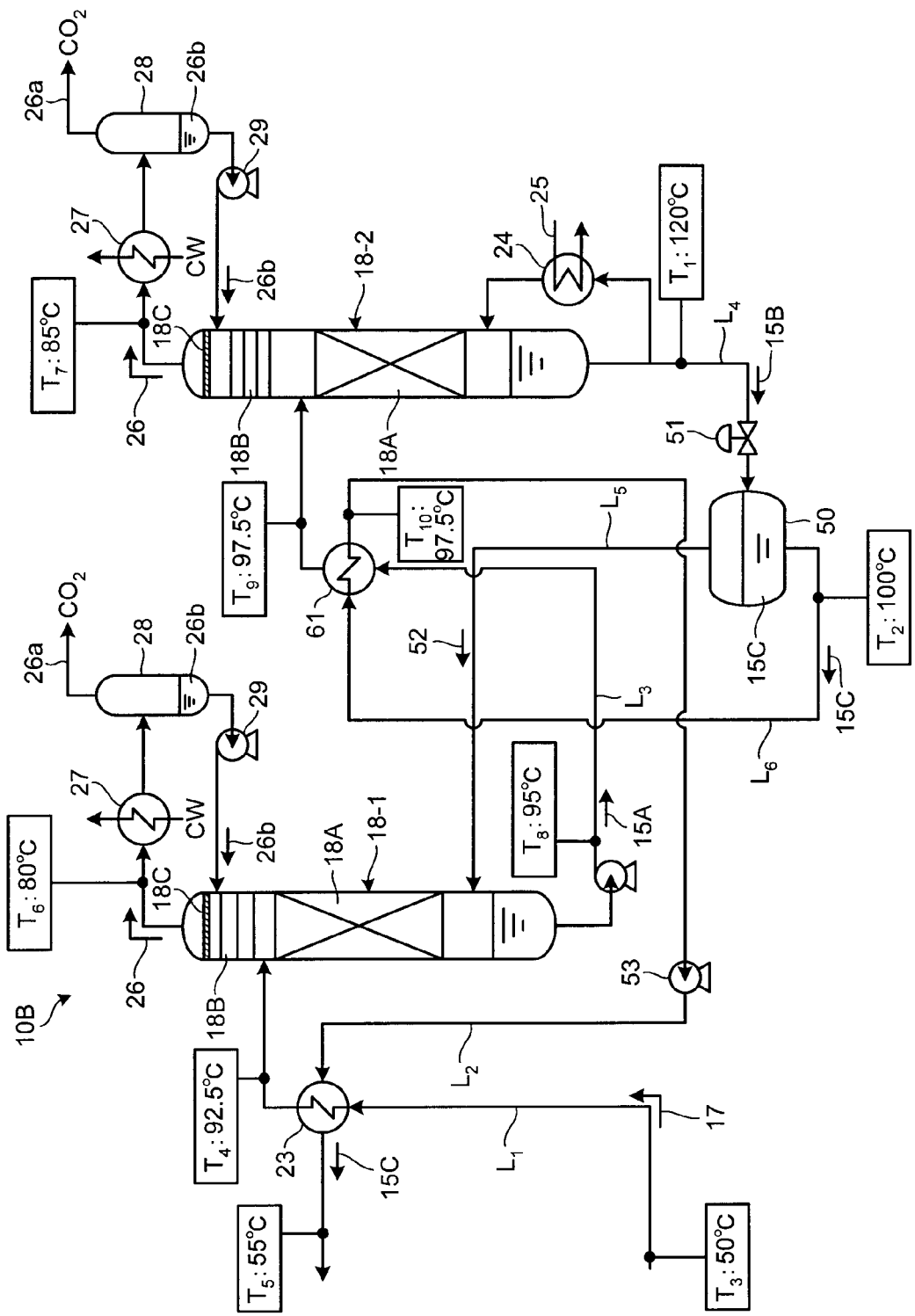
FIG. 3 is a diagram illustrating main parts of a first absorbent regenerator and a second absorbent regenerator according to a second embodiment.

A $CO_2$ recovery system according to an embodiment of the invention will be described with reference to the drawings. FIG. 3 is a diagram illustrating main parts of a first absorbent regenerator and a second absorbent regenerator according to a second embodiment. The same members as the members of the first embodiment are denoted by the same reference numerals, and the description thereof will not be made.

As illustrated in FIG. 3, a $CO_2$ recovery system 10B includes a lean/lean solution heat exchanger 61 in the $CO_2$ recovery system 10A illustrated in FIG. 2. The lean/lean solution heat exchanger 61 is provided at an intersection between the first lean solution supply line $L_3$ through which the first lean solution 15A is supplied to the second absorbent regenerator 18-2 from the first absorbent regenerator 18-1 and a supply line $L_6$ through which the third lean solution 15C is supplied from the flash drum 50, and exchanges heat between the first lean solution 15A and the third lean solution 15C.

Here, a second lean solution 15B, which is regenerated in the second absorbent regenerator 18-2, is introduced into the flash drum 50 and flashed, so that the temperature of the third lean solution 15C becomes 100° C. However, the third lean solution 15C is subjected to heat exchange by the lean/lean solution heat exchanger 61, so that the temperature of the third lean solution 15C is further lowered. Then, the third lean solution 15C is introduced into the rich/lean solution heat exchanger 23, and exchanges heat with a rich solution 17.

For example, since the temperature $T_2$ of the third lean solution 15C is 100° C. when the temperature $T_8$ of the first lean solution 15A is 95° C., the temperature $T_9$ of the first lean solution 15A rises to 97.5° C. In contrast, the temperature $T_{10}$ of the third lean solution 15C is lowered to 97.5° C.

Further, when the temperature $T_3$ of the rich solution 17 is 50° C., heat exchange is performed by the third lean solution 15C which is introduced into the rich/lean solution heat exchanger 23 and of which the temperature $T_{10}$ is 97.5° C. Accordingly, the temperature $T_4$ of the rich solution 17 after heat exchange becomes 92.5° C. Furthermore, the temperature $T_5$ of the third lean solution 15C after heat exchange is lowered to 55° C. Meanwhile, the temperature $T_6$ of a solution, which is discharged as vapor to the outside from the first absorbent regenerator 18-1, is 80° C., and the temperature $T_7$ of a solution, which is discharged to the outside from the second absorbent regenerator 18-2, is 85° C.

Here, the pressure in the absorbent regenerator 18 is 0.9 kg/cm$^2$G.

Accordingly, since the temperature of the rich solution 17, which is introduced into the first absorbent regenerator 18-1, is lower than that in the past, it is possible to reduce the amount of reboiler heat at the first absorbent regenerator 18-1.

Here, the breakdown of the amount of reboiler heat of the first and second absorbent regenerators 18-1 and 18-2 corresponds to the sum $Q_R$ (601 kcal/kg$CO_2$) of (a) the amount Q1 of reaction heat that is required to regenerate the rich solution 17 (404 kcal/kg$CO_2$), (b) the amount Q2 of heat loss of a solution that is discharged from the absorbent regenerator 18 (55 kcal/kg$CO_2$), and (c) the amount Q3 of heat loss of vapor that is discharged together with $CO_2$ from the first and second absorbent regenerators 18-1 and 18-2 (142 kcal/kg$CO_2$).

[Third Embodiment]

Figure 4:
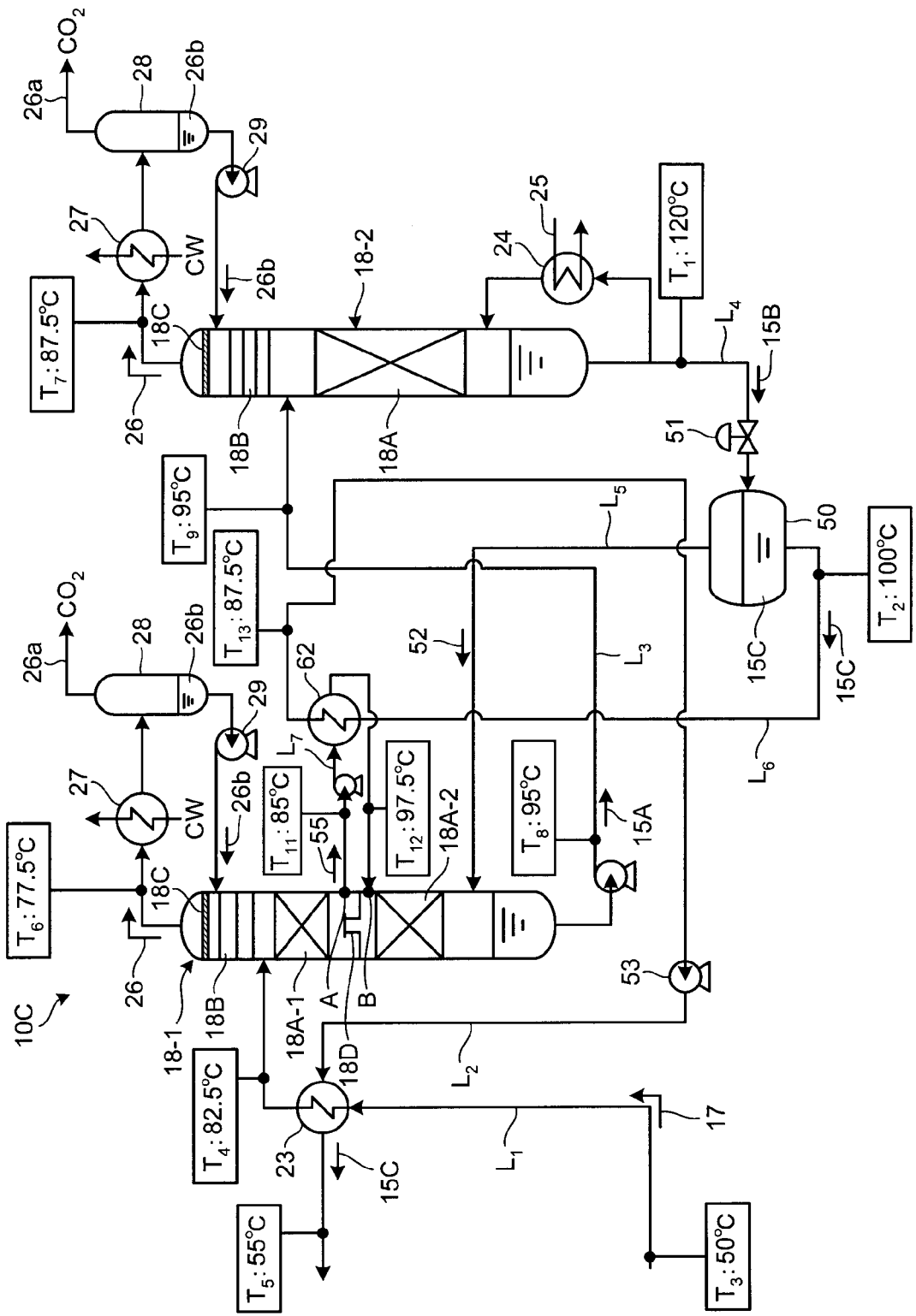
FIG. 4 is a diagram illustrating main parts of a first absorbent regenerator and a second absorbent regenerator according to a third embodiment.

A $CO_2$ recovery system according to an embodiment of the invention will be described with reference to the drawings. FIG. 4 is a diagram illustrating main parts of a first absorbent regenerator and a second absorbent regenerator according to a third embodiment. The same members as the members of the first embodiment are denoted by the same reference numerals, and the description thereof will not be made.

As illustrated in FIG. 4, a $CO_2$ recovery system 10C includes a port A which is provided in the first absorbent regenerator 18-1 at a middle portion in a vertical axis direction of the first absorbent regenerator and through which a semi-lean solution 55 is extracted; a circulation line $L_7$ to which the semi-lean solution 55 is extracted and along which the semi-lean solution 55 returns to a return port B closer to the bottom than the extraction port A; and a semi-lean/lean solution heat exchanger 62 which is provided on the circulation line $L_7$ and where a third lean solution 15C exchanges heat with the semi-lean solution 55 in the $CO_2$ recovery system 10A illustrated in FIG. 2. In FIG. 4, filling portions 18A-1 and 18A-2 and a chimney tray 18D are illustrated.

Here, a second lean solution 15B, which is generated in the second absorbent regenerator 18-2, is introduced into the flash drum 50 and flashed, so that the temperature of a lean solution 15 becomes 100° C.

A semi-lean solution 55 is extracted from the extraction port A of the circulation line $L_7$, and the third lean solution 15C exchanges heat with the semi-lean solution 55 at the semi-lean/lean solution heat exchanger 62, so that the temperature of the semi-lean solution 55 rises. After that, the semi-lean solution 55 is introduced into the first absorbent regenerator 18-1 through the port B. Accordingly, it is possible to reduce the amount of vapor in the first absorbent regenerator 18-1.

In contrast, the temperature of the third lean solution 15C is made to be lower than the case of the first embodiment by the semi-lean/lean solution heat exchanger 62. After the temperature of the third lean solution 15C is lowered, the third lean solution 15C is introduced into the rich/lean solution heat exchanger 23 and exchanges heat with a rich solution 17.

Here, when the temperature $T_1$ of the second lean solution 18B discharged from the second absorbent regenerator 18-2 is, for example, 120° C., the second lean solution 18B is flashed in the flash drum 50. Accordingly, the temperature $T_2$ of the third lean solution 15C, which has been flashed, becomes about 100° C.

The semi-lean solution 55 is extracted from the extraction port A of the circulation line $L_7$, and the third lean solution 15C exchanges heat with the semi-lean solution 55 at the semi-lean/lean solution heat exchanger 62, so that the temperature $T_{12}$ of the semi-lean solution 55, which has a temperature $T_{11}$ of 85° C., rises to 97.5° C. After that, the semi-lean solution 55 is introduced into the first absorbent regenerator 18-1 through the port B. Accordingly, it is possible to reduce the amount of vapor in the first absorbent regenerator 18-1.

In contrast, the temperature of the third lean solution 15C is made to be lower than the case of the first embodiment by the semi-lean/lean solution heat exchanger 62, so that temperature $T_{13}$ is lowered to 87.5° C.

For example, when the temperature $T_3$ of the rich solution 17 is 50° C., heat exchange is performed by the third lean solution 15C which is introduced into the rich/lean solution heat exchanger 23 and of which the temperature $T_{13}$ is 87.5° C. Accordingly, the temperature $T_4$ of the rich solution 17 after heat exchange becomes 82.5° C. Furthermore, the temperature $T_5$ of the third lean solution 15C after heat exchange is lowered to 55° C. Meanwhile, the temperature $T_6$ of a solution, which is discharged as vapor to the outside from the first absorbent regenerator 18-1, is 77.5° C., and the temperature $T_7$ of a solution, which is discharged to the outside from the second absorbent regenerator 18-2, is 87.5° C.

Here, the pressure in the absorbent regenerator 18 is 0.9 kg/cm²G.

Accordingly, since the temperature of the rich solution 17, which is introduced into the first absorbent regenerator 18-1, is lower than that in the past, it is possible to reduce the amount of reboiler heat at the first absorbent regenerator 18-1.

Here, the breakdown of the amount of reboiler heat of the first and second absorbent regenerators 18-1 and 18-2 corresponds to the sum $Q_R$ (593 kcal/kgCO$_2$) of (a) the amount Q1 of reaction heat that is required to regenerate the rich solution 17 (404 kcal/kgCO$_2$), (b) the amount Q2 of heat loss of a solution that is discharged from the absorbent regenerator 18 (55 kcal/kgCO$_2$), and (c) the amount Q3 of heat loss of vapor that is discharged together with CO$_2$ from the first and second absorbent regenerators 18-1 and 18-2 (134 kcal/kgCO$_2$).

Since the amount of reboiler heat of the first and second absorbent regenerators 18-1 and 18-2 of the CO$_2$ recovery system 10C according to the invention illustrated in FIG. 4 is 593 kcal/kgCO$_2$ and the amount of reboiler heat of the absorbent regenerator 18 of the CO$_2$ recovery system 100 in the related art illustrated in FIG. 6 is 665 kcal/kgCO$_2$ as described above, it has been found out that the amount of reboiler heat can be significantly reduced.

[Fourth Embodiment]

Figure 5:
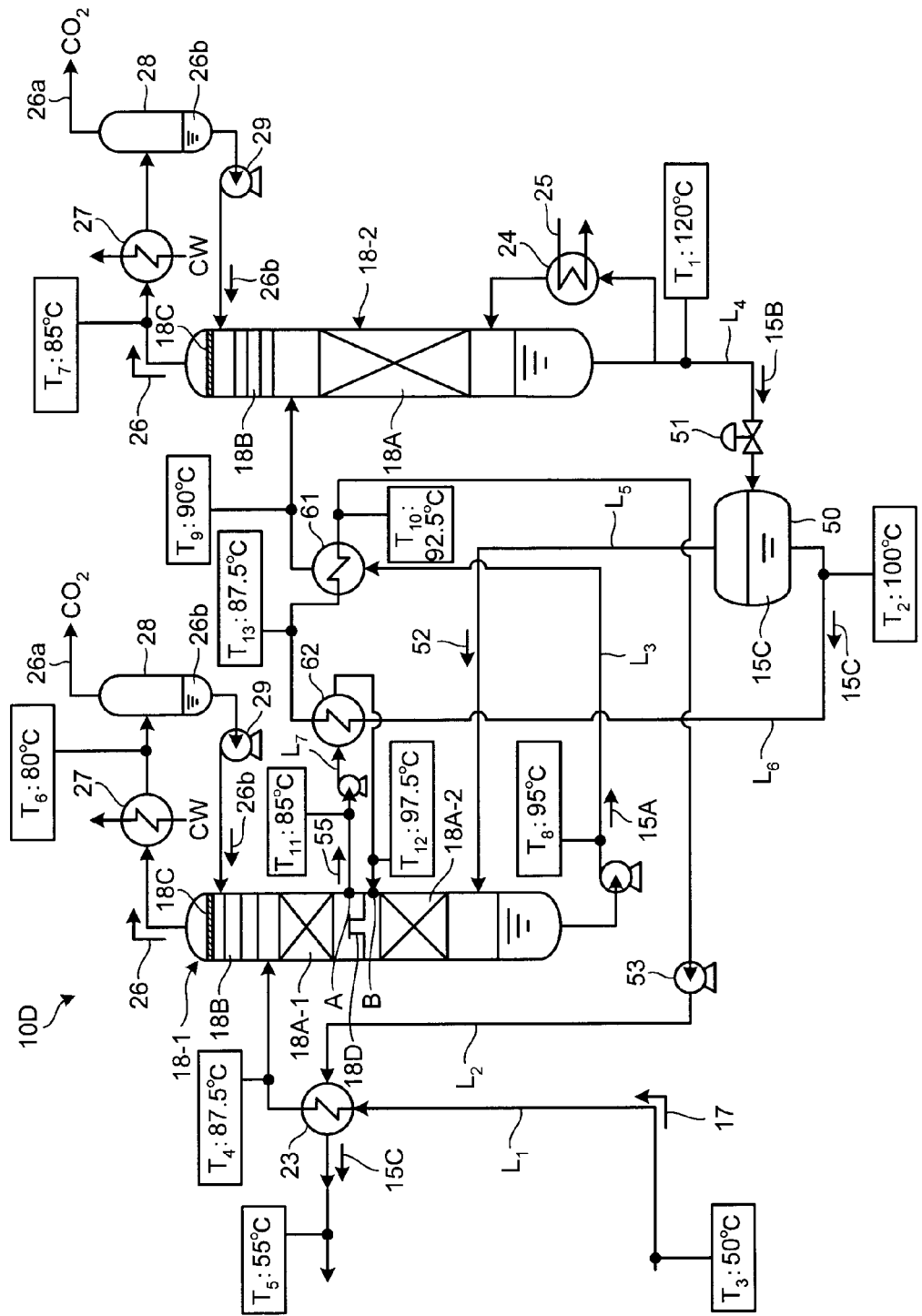
FIG. 5 is a diagram illustrating main parts of a first absorbent regenerator and a second absorbent regenerator according to a fourth embodiment.

A CO$_2$ recovery system according to an embodiment of the invention will be described with reference to the drawings. FIG. 5 is a diagram illustrating main parts of a first absorbent regenerator and a second absorbent regenerator according to a fourth embodiment. The same members as the members of the first to third embodiments are denoted by the same reference numerals, and the description thereof will not be made.

As illustrated in FIG. 5, a CO$_2$ recovery system 10D is obtained from the integration of the CO$_2$ recovery system 10B illustrated in FIG. 3 and the CO$_2$ recovery system 10C illustrated in FIG. 4. The CO$_2$ recovery system 10D includes a lean/lean solution heat exchanger 61 where a first lean solution 15A exchanges heat with a third lean solution 15C, and a semi-lean/lean solution heat exchanger 62 where a third lean solution 15C exchanges heat with a semi-lean solution 55.

Here, when the temperature $T_1$ of a second lean solution 15B discharged from a second absorbent regenerator 18-2 is, for example, 120° C., the second lean solution 15B is flashed in the flash drum 50. Accordingly, the temperature $T_2$ of the third lean solution 15C, which has been flashed, becomes about 100° C.

A semi-lean solution 55 is extracted from an extraction port A of a circulation line $L_7$, and the third lean solution 15C exchanges heat with the semi-lean solution 55 at the semi-lean/lean solution heat exchanger 62, so that and the temperature $T_{12}$ of the semi-lean solution 55, which has a temperature $T_{11}$ of 85° C., rises to 97.5° C. After that, the semi-lean solution 55 is introduced into a first absorbent regenerator 18-1 through a port B. Accordingly, it is possible to reduce the amount of vapor in the first absorbent regenerator 18-1.

In contrast, the temperature of the third lean solution 15C is made to be lower than the case of the first embodiment by the semi-lean/lean solution heat exchanger 62, so that temperature $T_{13}$ is lowered to 87.5° C.

Since the temperature $T_{13}$ of the third lean solution 15C is 87.5° C. when the temperature $T_8$ of the first lean solution 15A is 95° C., the temperature $T_9$ of the first lean solution 15A is lowered to 90° C. In contrast, the temperature $T_{10}$ of the third lean solution 15C rises to 92.5° C.

Further, when the temperature $T_3$ of a rich solution 17 is 50° C., heat exchange is performed by a third lean solution 15C which is introduced into the rich/lean solution heat exchanger 23 and of which the temperature $T_{10}$ is 92.5° C. Accordingly, the temperature $T_4$ of the rich solution 17 after heat exchange becomes 87.5° C. Furthermore, the temperature $T_5$ of the third lean solution 15C after heat exchange is lowered to 55° C. Meanwhile, the temperature $T_6$ of a solution, which is discharged as vapor to the outside from the first absorbent regenerator 18-1, is 80° C., and the temperature $T_7$ of a solution, which is discharged to the outside from the second absorbent regenerator 18-2, is 85° C.

Here, the pressure in the absorbent regenerator 18 is 0.9 kg/cm²G.

Accordingly, since the temperature of the rich solution 17, which is introduced into the first absorbent regenerator 18-1, is lower than that in the past, it is possible to reduce the amount of reboiler heat at the first absorbent regenerator 18-1.

Here, the breakdown of the amount of reboiler heat of the first and second absorbent regenerators 18-1 and 18-2 corresponds to the sum $Q_R$ (601 kcal/kgCO$_2$) of (a) the amount Q1 of reaction heat that is required to regenerate the rich solution 17 (404 kcal/kgCO$_2$), (b) the amount Q2 of heat loss of a solution that is discharged from the absorbent regenerator 18 (55 kcal/kgCO$_2$), and (c) the amount Q3 of heat loss of vapor that is discharged together with CO$_2$ from the first and second absorbent regenerators 18-1 and 18-2 (142 kcal/kgCO$_2$).

Since the amount of reboiler heat of the first and second absorbent regenerators 18-1 and 18-2 of the CO$_2$ recovery system 10D according to the invention illustrated in FIG. 5 is 601 kcal/kgCO$_2$ and the amount of reboiler heat of the absorbent regenerator 18 of the CO$_2$ recovery system 100 in the related art illustrated in FIG. 6 is 665 kcal/kgCO$_2$ as described above, it has been found out that the amount of reboiler heat can be significantly reduced.

The relation between the above-mentioned amounts of reboiler heat is illustrated in Table 1.

TABLE 1

|   | Amount ($Q_1$) of reaction heat | Amount ($Q_2$) of heat loss | Amount ($Q_3$) of heat loss | Sum ($Q_R$) |
|---|---|---|---|---|
| First embodiment | 404 | 55 | 162 | 621 |
| Second embodiment | 404 | 55 | 142 | 601 |
| Third embodiment | 404 | 55 | 134 | 593 |

TABLE 1-continued

| | Amount ($Q_1$) of reaction heat | Amount ($Q_2$) of heat loss | Amount ($Q_3$) of heat loss | Sum ($Q_R$) |
|---|---|---|---|---|
| Fourth embodiment | 404 | 55 | 142 | 601 |
| Related art | 404 | 110 | 151 | 665 |

(Unit kcal/kg · $CO_2$)

As illustrated in Table 1, it has been found out that the energy efficiency of the system of the third embodiment is highest.

As described above, according to the $CO_2$ recovery system of the invention, it is possible to significantly reduce the heat energy of reboiler that is required to regenerate an absorbent when the size of the $CO_2$ recovery system is increased so that the amount of $CO_2$ to be recovered per day becomes, for example, 1000 t or more.

Accordingly, it is possible to save the energy of the entire system.

| | Reference Signs List |
|---|---|
| 10, 10A to 10D | $CO_2$ RECOVERY SYSTEM |
| 11 | BOILER |
| 12 | EXHAUST GAS |
| 15 | $CO_2$-ABSORBENT (LEAN SOLUTION) |
| 15A | FIRST LEAN ABSORBENT (FIRST LEAN SOLUTION) |
| 15B | SECOND LEAN ABSORBENT (SECOND LEAN SOLUTION) |
| 15C | THIRD LEAN ABSORBENT (THIRD LEAN SOLUTION) |
| 16 | $CO_2$ ABSORBER |
| 17 | RICH SOLUTION |
| 18-1 | FIRST ABSORBENT REGENERATOR |
| 18-2 | SECOND ABSORBENT REGENERATOR |

The invention claimed is:

1. A $CO_2$ recovery system comprising:
a $CO_2$ absorber for bringing a cooled $CO_2$-containing exhaust gas into contact with a $CO_2$-absorbent absorbing $CO_2$ so as to remove $CO_2$ from the exhaust gas;
a first absorbent regenerator for regenerating an absorbent by releasing $CO_2$ from a $CO_2$-absorbent having absorbed $CO_2$;
a second absorbent regenerator for regenerating an absorbent by releasing residual $CO_2$ from a first lean solution discharged from the first absorbent regenerator; and
a flash drum for flashing a second lean solution discharged from the second absorbent regenerator,
wherein vapor generated in the flash drum is inputted to the first absorbent regenerator, and
wherein the $CO_2$ recovery system, further comprises a lean/lean solution heat exchanger for heat-exchanging the first lean solution with a third lean solution flashed in the flash drum.

2. A $CO_2$ recovery system comprising:
a $CO_2$ absorber for bringing cooled $CO_2$ containing exhaust gas into contact with a $CO_2$-absorbent absorbing $CO_2$ so as to remove $CO_2$ from the exhaust gas;
a first absorbent regenerator for regenerating an absorbent by releasing $CO_2$ from a $CO_2$-absorbent having absorbed $CO_2$;
a second absorbent regenerator for regenerating an absorbent by releasing residual $CO_2$ from a first lean solution discharged from the first absorbent regenerator; and
a flash drum for flashing a second lean solution discharged from the second absorbent regenerator,
wherein vapor generated in the flash drum is inputted to the first absorbent regenerator, and
wherein the $CO_2$ recovery system further comprises:
a port provided in the first absorbent regenerator at a middle portion in a vertical axis direction of the first absorbent regenerator, for extracting a semi-lean solution;
a circulation line to which the semi-lean solution is extracted, for returning the semi-lean solution to a return port closer to the bottom than the extraction port; and
a semi-lean/lean solution heat exchanger provided on the circulation line, for heat-exchanging a third lean solution flashed in the flash drum with the semi-lean solution.

3. A $CO_2$ recovery system comprising:
a $CO_2$ absorber for bringing cooled $CO_2$ containing exhaust gas into contact with a $CO_2$-absorbent absorbing $CO_2$ so as to remove $CO_2$ from the exhaust gas;
a first absorbent regenerator for regenerating an absorbent by releasing $CO_2$ from a $CO_2$-absorbent having absorbed $CO_2$;
a second absorbent regenerator for regenerating an absorbent by releasing residual $CO_2$ from a first lean solution discharged from the first absorbent regenerator; and
a flash drum for flashing a second lean solution discharged from the second absorbent regenerator,
wherein vapor generated in the flash drum is inputted to the first absorbent regenerator, and
wherein the $CO_2$ recovery system further comprises:
a lean/lean solution heat exchanger for heat-exchanging the first lean solution with a third lean solution flashed in the flash drum;
a port provided in the first absorbent regenerator at a middle portion in a vertical axis direction of the first absorbent regenerator, for extracting a semi-lean solution;
a circulation line to which the semi-lean solution is extracted, for returning the semi-lean solution to a return port closer to the bottom than the extraction port; and
a semi-lean/lean solution heat exchanger provided on the circulation line, for heat-exchanging the third lean solution with the semi-lean solution.

4. The $CO_2$ recovery system according to claim 1, further comprising:
a cooling tower for cooling the $CO_2$-containing exhaust gas by cooling water.

5. The $CO_2$ recovery system according to claim 2 further comprising:
a cooling tower for cooling the $CO_2$-containing exhaust gas by cooling water.

6. The $CO_2$ recovery system according to claim 3, further comprising:
a cooling tower for cooling the $CO_2$-containing exhaust gas by cooling water.

* * * * *